US006993776B2

(12) United States Patent
Yamanaka et al.

(10) Patent No.: US 6,993,776 B2
(45) Date of Patent: Jan. 31, 2006

(54) DISC CENTERING DEVICE

(75) Inventors: Takashi Yamanaka, Tokyo (JP); Toshio Yoshimura, Kawasaki (JP)

(73) Assignee: Tanashin Denki Co., Ltd., Tokyo (JP)

( * ) Notice: Subject to any disclaimer, the term of this patent is extended or adjusted under 35 U.S.C. 154(b) by 252 days.

(21) Appl. No.: 10/365,524

(22) Filed: Feb. 13, 2003

(65) Prior Publication Data

US 2003/0161244 A1 Aug. 28, 2003

(30) Foreign Application Priority Data

Feb. 28, 2002 (JP) ............................ 2002-052912

(51) Int. Cl.
*G11B 33/02* (2006.01)

(52) U.S. Cl. ...................................... 720/623; 720/704

(58) Field of Classification Search ........ 720/619–620, 720/622–623, 703–704; 360/99.02, 99.06
See application file for complete search history.

(56) References Cited

U.S. PATENT DOCUMENTS

| | | | | |
|---|---|---|---|---|
| 4,498,162 | A * | 2/1985 | Schatteman | 720/620 |
| 5,031,169 | A * | 7/1991 | Kato et al. | 720/625 |
| 5,097,460 | A | 3/1992 | Camps et al. | 720/621 |
| 5,113,388 | A * | 5/1992 | Yamada et al. | 720/704 |
| 5,166,917 | A * | 11/1992 | Decoster et al. | 720/621 |
| 5,173,894 | A * | 12/1992 | Kido | 720/623 |
| 5,195,077 | A * | 3/1993 | Ishikawa et al. | 720/623 |
| 5,204,849 | A * | 4/1993 | Yamada et al. | 720/623 |
| 5,828,641 | A * | 10/1998 | Abe et al. | 720/645 |
| 6,147,948 | A * | 11/2000 | Tanaka et al. | 720/621 |
| 6,167,015 | A * | 12/2000 | Jeong | 720/623 |
| 6,272,093 | B1 * | 8/2001 | Kurozuka et al. | 720/627 |
| 6,288,982 | B1 * | 9/2001 | Kato | 369/30.36 |
| 6,542,453 | B1 * | 4/2003 | Yamada et al. | 720/616 |

FOREIGN PATENT DOCUMENTS

JP 2001-110117 4/2001

* cited by examiner

*Primary Examiner*—Brian E. Miller
(74) *Attorney, Agent, or Firm*—Bacon & Thomas, PLLC

(57) ABSTRACT

It is sought to simplify a disc centering device. Stopper portions for centering a small-size disc are provided on disc sensors, and guide portions are provided, which, when the disc sensors are moved with insertion of a large-size disc, engage with the disc sensors to move the stopper portions to the outside of a disc transport path.

3 Claims, 6 Drawing Sheets

DISC CENTERING DEVICE

BACKGROUND OF THE INVENTION

1. Field of the Invention

This invention relates to a disc centering device in a disc player having a disc insertion slot for centering a disc such as a compact disc as information carrier, which is transferred from the disc insertion slot to a playback position such that the center of the disc is held on a turntable.

2. Description of the Prior Art

A disc player having a disc insertion slot usually has a disc centering mechanism to make the center of a disc inserted from the disc insertion slot to be coincident with the turntable center. For first centering, the centering mechanism stops a disc transferred from the disc insertion slot after the disc center slightly passes beyond the turntable center. For second centering, the centering mechanism pulls back the disc center to be coincident with the turntable center. The first centering is effected by a mechanism, which is disclosed in Japanese Patent Laid Open Publication No. 2001-110117, and comprises a pair of disc sensors 22 coupled to the disc insertion slot for in opposite directions, a lever 54 to be rocked or pivoted with insertion of a large-size disc, and a small-size disc stopper part 52. When the lever 54 is rocked by a large-size disc, it causes rocking or pivoting of a centering guide arm to cause retreat of the small-size disc stopper 52 from a disc transport path.

The above mechanism for effecting the first centering is complicated in construction with the provision of the lever 54, which is rocked with insertion of the large-size disc, for causing advancement and retreat of the small-size disc to and from the disc transport path. Besides, the mechanism performs complicated disc transport such that the small-size disc is transported in a slightly upwardly slanted state to the playback position.

The present invention has an object of providing a disc centering mechanism, which permits simplification of the construction.

SUMMARY OF THE INVENTION

In a disc centering device according to a first aspect of the invention, disc sensors have stoppers for a small-size disc having a diameter of, for example 8 cm, which are brought into contact with the outer periphery of the small-size disc transported by a transporting means when the small-size disc slightly passes beyond the turntable center. The above stoppers will be explained hereinafter as "smallsize disc stoppers" or "stopper portions". The disc centering device also has guide portions or pieces, which serve such that when insertion of a large-size disc having a diameter of, for example 12 cm, causes rocking or pivoting of the disc sensors against biasing forces, they engage with the disc sensors and move the small-size disc stoppers to the outside of a disc transport path. The disc sensors are locked in their rocked positions when the large-size disc is inserted. First centering thus can be obtained by merely providing the disc sensors themselves with the small-size disc stoppers, and it is thus possible to simplify the centering mechanism.

As an alternative, it is also possible to form the disc sensors themselves from an elastic material. In this case, when the disc sensors are pushed against the guide surfaces, the disc sensors undergo elastic deformation to move the small-size disc stoppers to the outside of the disc transport path. As a further alternative, it is possible to provide the disc sensors such as to be capable of being brought into contact with and separated from the support member and provide the support member with elastic members for pushing the disc sensors against the guide surfaces. In any case, when large-size disc insertion causes rocking of the disc sensors against biasing forces, the small-size disc stoppers are brought into engagement with the guide surfaces and moved to the outside of the disc transport path, and thus they do not interfere with the large-size disc insertion. Further simplification of the construction is obtainable by providing the guide pieces on the support member supporting the disc sensors.

BRIEF DESCRIPTION OF THE DRAWINGS

The above and other objects, features and advantages of the invention will become more apparent upon reading of the following detailed description when the same is read with reference to the accompanying drawings, in which.

DETAILED DESCRIPTION OF THE PREFERRED EMBODIMENTS

Figure 1:
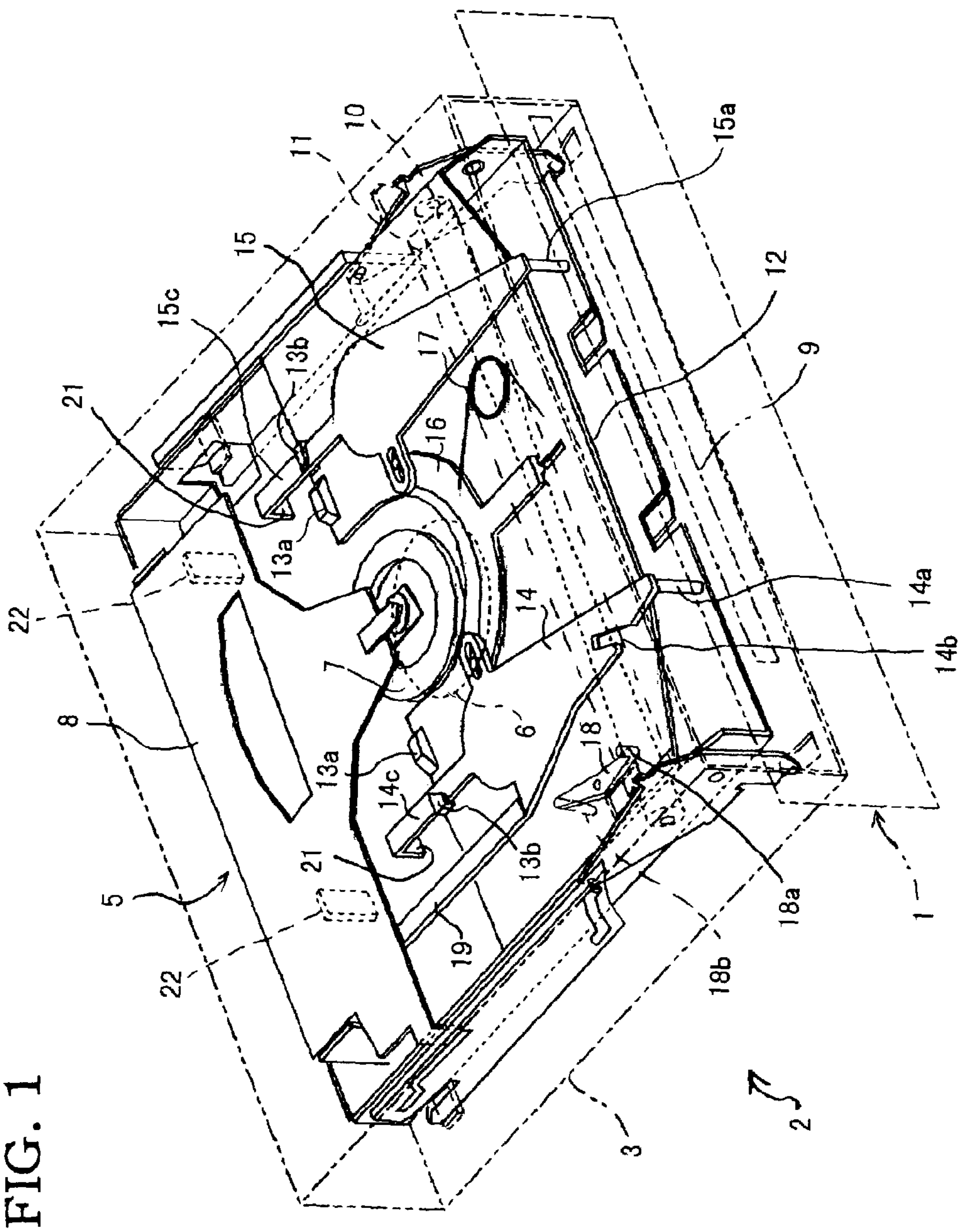
FIG. 1 is a perspective view showing a disc centering device of a first embodiment according to the present invention.

The disc centering device according to the invention will now be described with reference to FIGS. 1 to 8. FIG. 1 is a perspective view showing a mechanical part of a disc player for a car. Shown by phantom lines is a cabinet 1, in which a disc player 2 is assembled. The disc player 2 has an outer chassis 3 and a sub-chassis 5 assembled therein via a damper (not shown) A turntable 6 is mounted on the sub-chassis 5 at the center thereof. A pick-up (not shown) is mounted movably such that it is directed toward a sub-chassis corner. Above the turntable 6, a clamper 7 is disposed, which serves to clamp a disc 28 or 29 between it and the turntable 6. The clamper 7 is supported by a mounting member 8 for rocking. When a clamper drive mechanism (not shown) is started, the mounting member 8 is caused to undergo rocking so as to bring the clamper 7 into contact with the turntable 6 or separate the clamper 7 therefrom.

The cabinet 1 has a disc insertion slot 9 for inserting a disc. Between the disc insertion slot 9 and the turntable 6, a transport roller 10 for transporting the disc and a guide 11 are mounted on the sub-chassis 6. The transport roller 10 serves to push an inserted disc against the guide 11 and withdraw, with rotation of a transport motor (not shown), the disc from the disc insertion slot into the cabinet 1. The guide 11 is mounted on a support member 12 as disc guide member describing a disc transport path, which is located on the top sized of the sub-chassis 5. The support member 12 has upwardly projecting cam pieces or guide pieces 13*a* as guide portions, and torque pieces 13*b*, which are located at positions on the opposite sides of the turntable 6.

A pair of disc sensors 14 and 15 is mounted for rocking on the support member 12. The disc sensors 14 and 15 have detecting pieces 14*a* and 15*a*, respectively, with free ends thereof for engagement with the outer periphery of a disc inserted into the disc insertion slot 9, and they are mounted on the support member 12 such that the centers of their rocking are located at positions intermediate between the turntable 6 and the disc insertion slot 9. The two disc sensors 14 and 15 are coupled to each other by a coupling member 16 such that they can be rocked in opposite directions. A torsion spring 17 (or spring member) for biasing the detecting pieces 14*a* and 15*a* of the two disc sensors directed toward the disc insertion slot, is provided between the coupling member 17 and the support member 12.

Near or adjacent to the disc sensor 14, a locking lever 18 has it central part mounted for rocking on the support member 12. The locking lever 18 has, at one end, a pin 18*a* for being engaged in a U-shaped notch 14*b* of the disc sensor 14 and, at the other end, a frictional contact pin 1*b* located in a disc transport path and serving to be in frictional contact with the outer periphery of a large-size disc 29 being transported. The locking lever 18 is normally biased by a very weak spring force spring for rocking in a direction of being detached from the U-shaped groove 14*b*. When the pin 18*a* is brought into the U-shaped groove 14*b* of the disc sensor 14, the locking lever 18 locks the two disc sensors 14 and 15 at the rocked positions.

Figure 2:
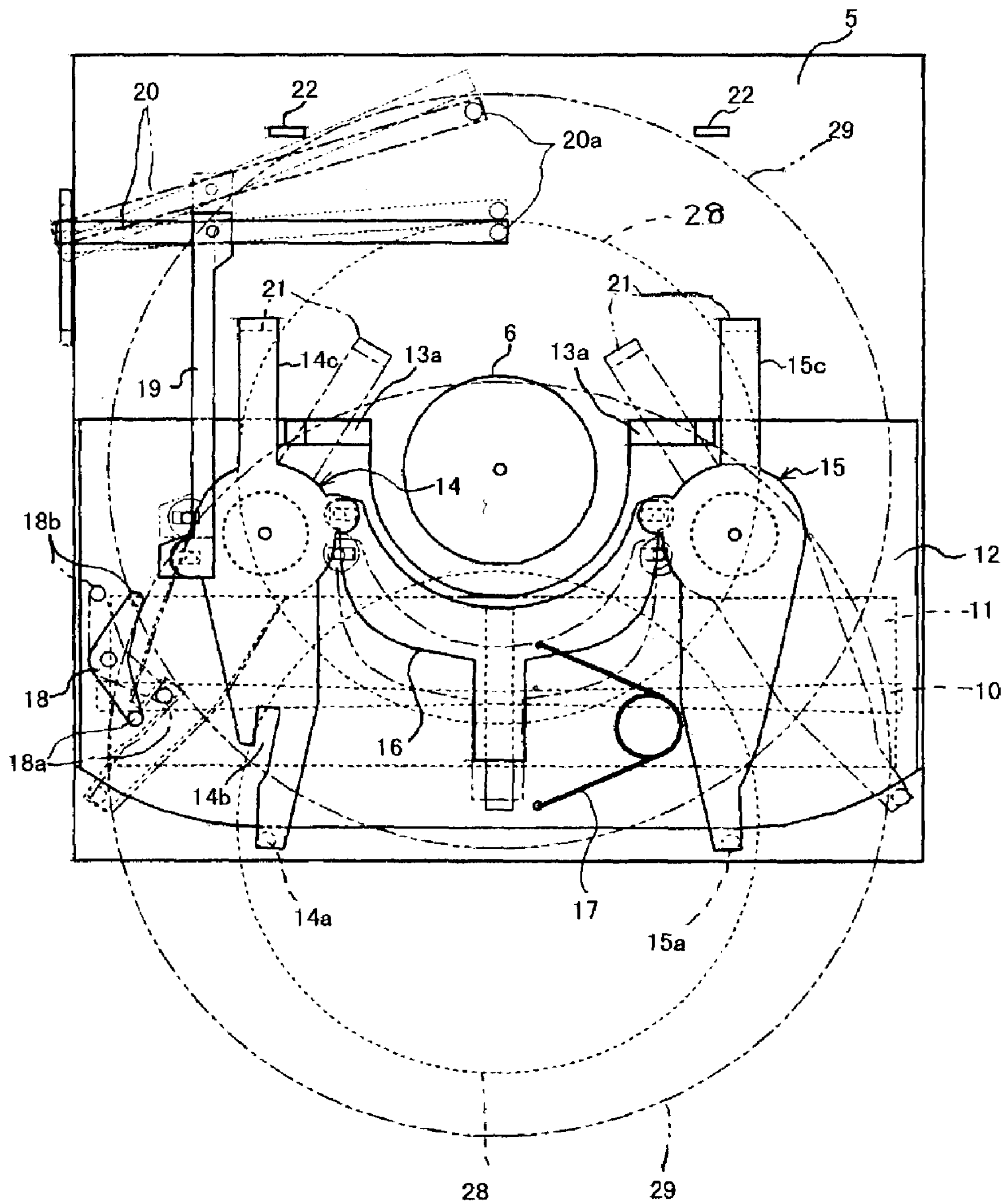
FIG. 2 is the plan view showing the disc centering device of the first embodiment.

As shown in FIG. 2, a movable member 19, which is movable for advancement and retreat with rocking of the disc sensor 14, has one end coupled to the disc sensor 14 and the other end coupled to a trigger lever 20, which is disposed behind the turntable 6. The trigger lever 20 has, at one end, a contact pin 20*a* which is located in the disc transport path. When the contact pin 20*a* is brought into contact with the outer periphery of the disc being pulled in by the disc transport means, it causes rocking of the trigger lever 20 about the coupled part of the movable member 10. With this rocking, the trigger lever 20 starts a clamper drive mechanism and a transport roller release mechanism (these mechanisms being not shown).

The pair disc sensors 14 and 15 each have a stopper portion 21 (i.e., small-size disc stoppers), which is to be in contact with the outer periphery of a small-size disc 28 when the center thereof has been transported to slightly exceed the center of the turntable 6. When the outer periphery of the small-size disc 28 is brought into contact with the stopper parts 21, first centering of the small-size disc 28 is effected. The stopper portions 21 are formed at the ends of thin elongate extensions 14*c* and 15*c* of the disc sensors 14 and 15 extending from the centers of rotation of the disc sensors 14 and 15 beyond the positions of the cam pieces 13*a*.

As the disc sensors 14 and 15 are rocked, side faces of the extensions 14*c* and 15*c* are brought into contact with the stems of the cam pieces 13*a*, and as they are rocked, the extensions 14*c* and 15*c* come to ride on the cam pieces 13*c* while undergoing elastic deformation. At this time, the ends of the stopper parts 21 are moved toward the top surface of the small-size disc 28. The tongue pieces 13*b* are formed to lap over the top surfaces of the extensions 14*c* and 15*c* when the disc sensors are not rocked. When the small-size disc 28 is brought into contact with the stopper parts 21, the tongue pieces 13*b* prohibit elastic deformation of the extensions 14*c* and 15*c*.

The top surface of the sub-chassis 5 has bent pieces (i.e., large-size disc stoppers) 22, which serve to stop a large-size disc 29 transported by the disc transporting means when it is brought into engagement with the outer periphery of the large-size disc 29. The bent pieces 22 are provided at positions to be contacted by the outer periphery of the large-size disc 29 when the center of the large-size disc 29 being transported slightly exceeds the center of the turntable 6. The position of the large-size disc 29, at which the center thereof slightly exceeds the center of the turntable 6, is the first centering position of the large-size disc 29.

Figure 3:
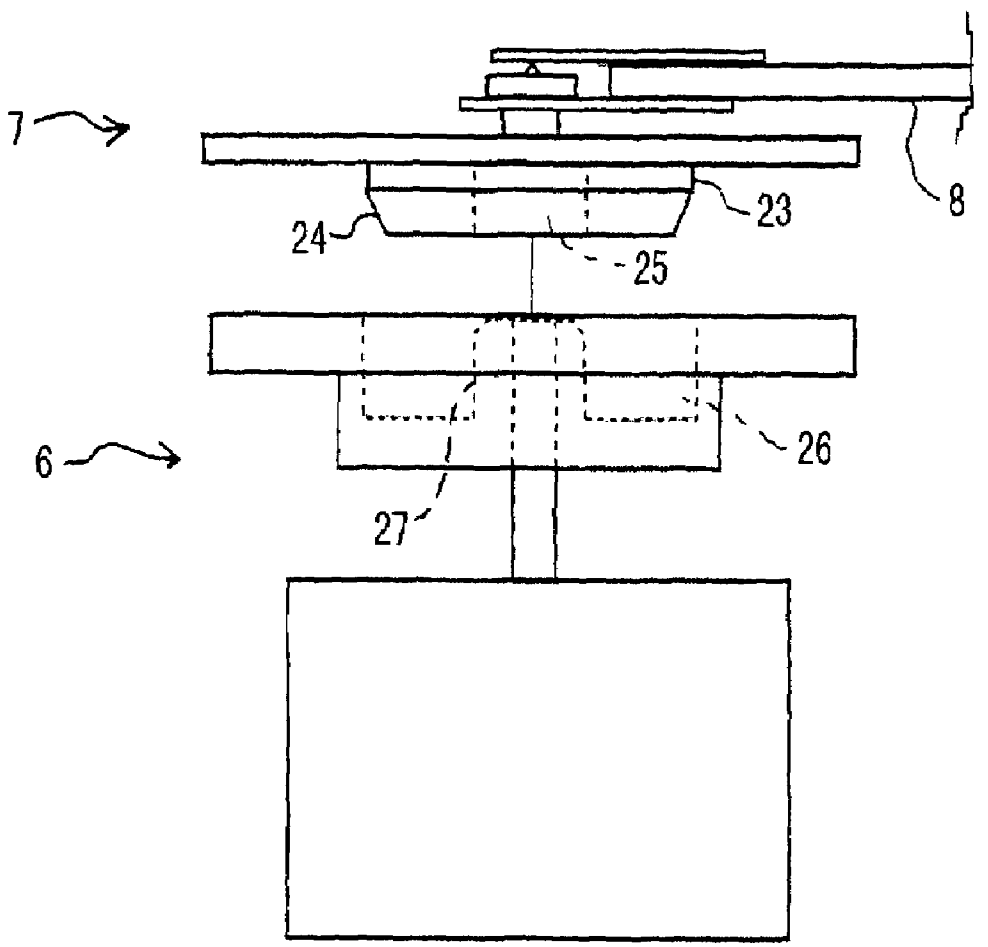
FIG. 3 is a fragmentary side view showing a turntable and a clamper of the first embodiment.

As shown in FIG. 3, the damper 7 has a cylindrical projection 23, which can be snugly engaged in the center hole of the disc. The cylindrical projection 23 has a tapered end surface 24, and it also has a recess 25. The turntable 6, on the other hand, has an accommodation recess 26 for accommodating the cylindrical projection 23 and also a cylindrical part 27, which projects from the bottom of the accommodation recess 26 and can be snugly engaged in the recess 25. After the transported small- or large-size disc 28 or 29 has been stopped in contact with stopper parts 21 or the bent pieces 22, the damper 7 approaches the turntable 6. As a result, the damper pulls back the center of the disc, which has slightly overshot beyond the center of the turntable 8, up to the center thereof. Thus, the outer periphery of the disc is separated from stopper parts 21 or the bent pieces 22, and the disc is now ready for rotation. This position is the second centering position.

Figure 4:
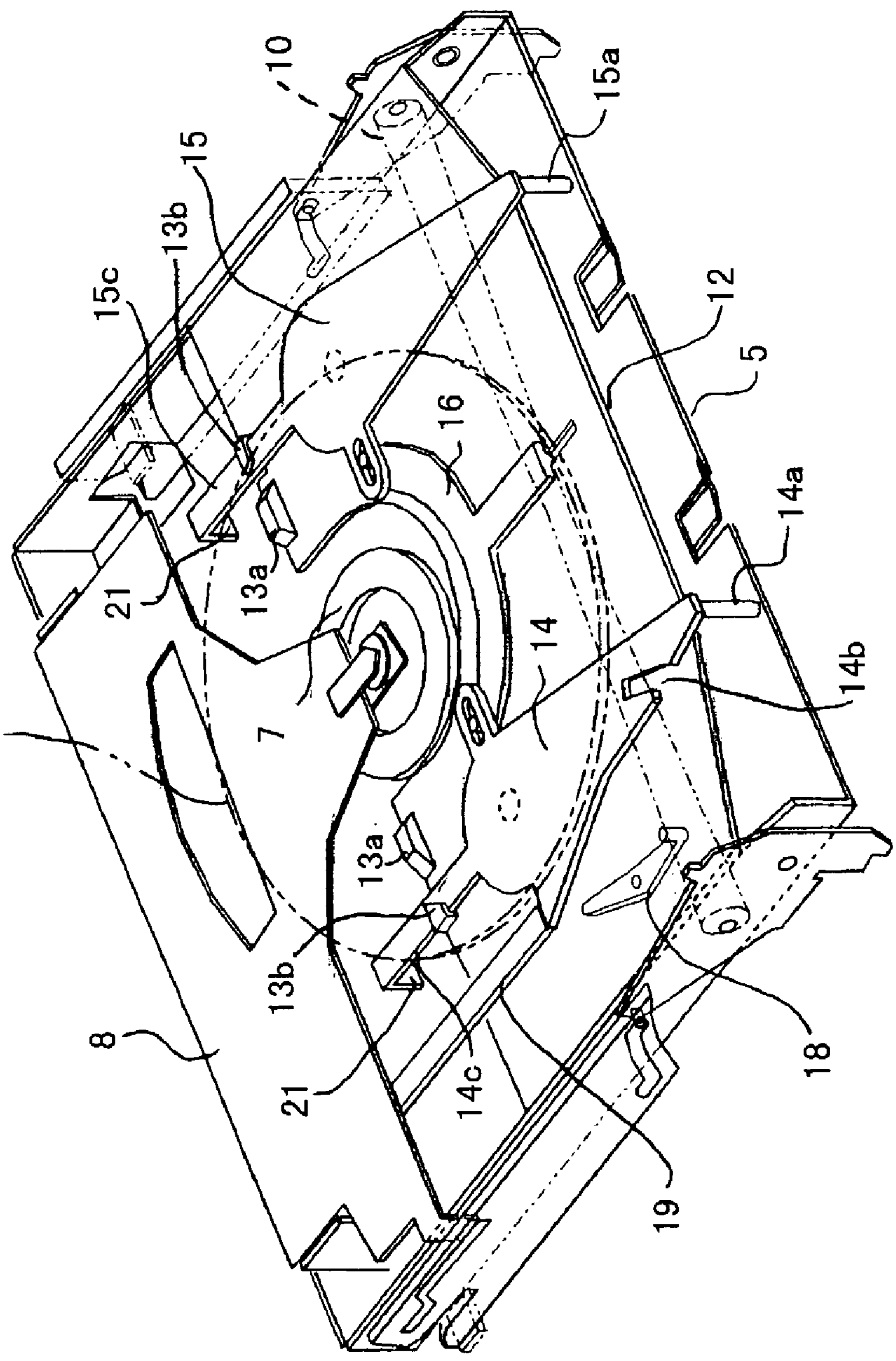
FIG. 4 is a perspective view of the first embodiment illustrating small-size disc centering.

The process in which the large- and small-size discs are transported until the second centering is effected is illustrated in FIGS. 4 to 7. When the small-size disc 28 as shown by broken line in FIG. 2 is clamped between the transport roller 10 and the guide 11, the outer periphery of the disc 28 pushes the detecting pieces 14*a* and 15*a* of the two disc sensors 14 and 15. As a result, the detecting pieces 14*a* and 15*a* are slightly rocked in opposite directions. With this rocking, the disc sensors 14 and 15 causes a switch (not shown) to be operated to start the transport motor. With the rotation of the transport roller 10, the small-size disc 28 is withdrawn from the disc insertion slot 9. When the diametrical part of the small-size disc 28 clears the detecting pieces 14*a* and 15*a* of the two disc sensors 14 and 15, the force of the torsion spring restores the disc sensors 14 and 15 to the initial positions thereof. Subsequently, the outer periphery of the small-size disc 28 is brought into contact with the two stopper parts 21, as shown in FIG. 4, and the disc is thus stopped. In this way, the first centering of the small-size disc 28 is completed.

Figure 5:
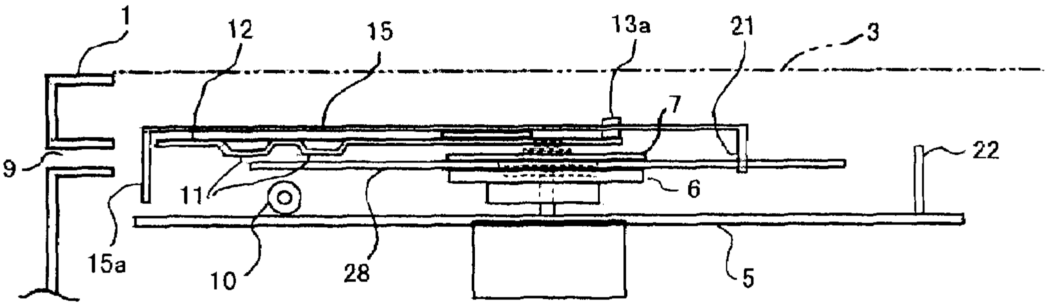
FIG. 5 is a side view of the first embodiment illustrating small-size disc centering.

Meanwhile, as the outer periphery of the small-size disc 28 pushes the contact pin 20*a* of the trigger lever 20, the trigger lever 20 is rocked to start the clamper drive mechanism. Thus, the clamper 7 is caused to approach the turntable 6, thus bringing the taper surface 24 into contact with the edge of the center hole of the small-size disc and pulling back the disc 28 to the position, at which the center of the disc 28 is coincident with the center of the turntable 6. In this way, the second centering of the small-size disc 28 is completed, as shown in FIG. 5.

As for the large-size disc 29, when the disc 29 as shown in FIG. 2 by a phantom line is clamped between the transport roller 10 and the guide 11, the two disc sensors 14 and 15 have been greatly rocked or pivoted with their detecting pieces 14*a* and 15*a* pushed by the outer periphery of the disc 29. When the diametric part of the large-size disc 29 is withdrawn from the disc insertion slot 9 into the cabinet with rotation of the transport roller 10, and clears the detecting pieces 14*a* and 15*a*, it engages with the contact pin 18*b* of the locking lever 18 and causes rocking thereof in the counterclockwise direction in the Figure. With this rocking, the pin 18*a* is pushed into the U-shaped notch 14*b* against the spring force.

Figure 6:
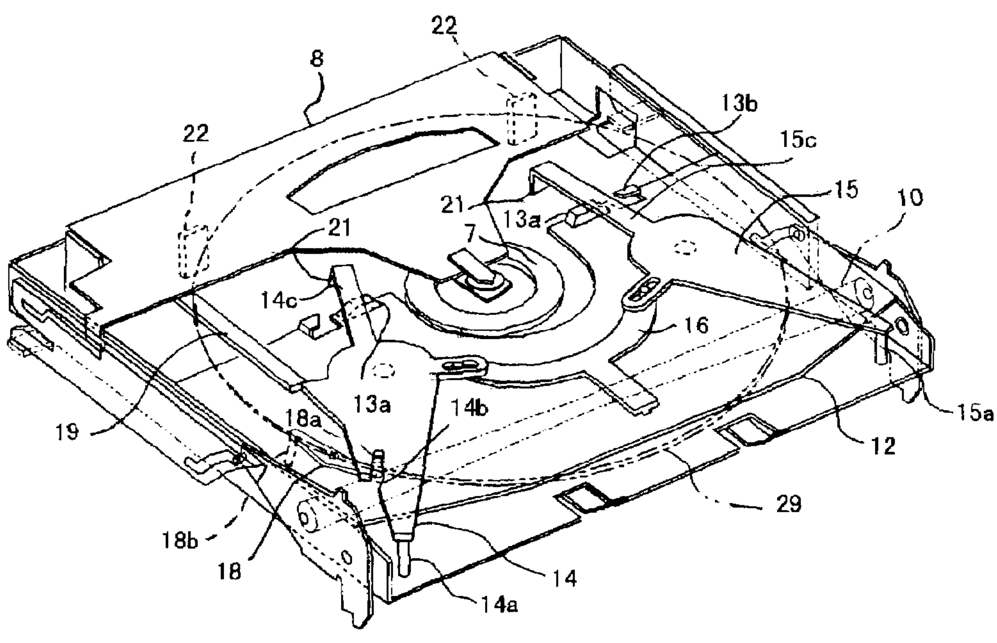
FIG. 6 is a side view of the first embodiment illustrating large-size disc centering.
Figure 7:
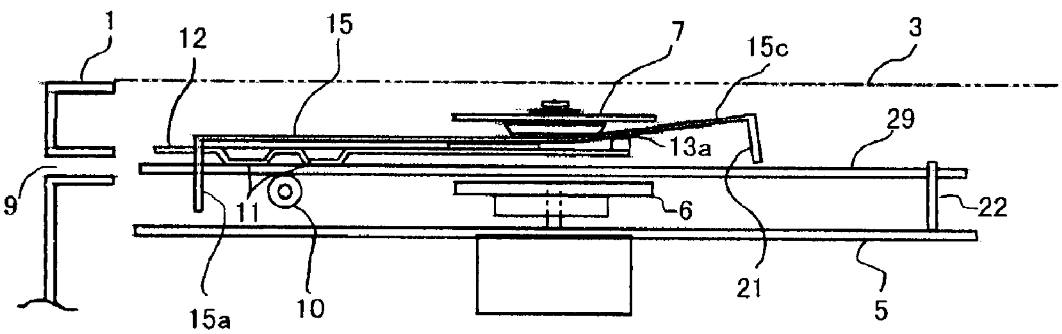
FIG. 7 is a perspective view of the first embodiment illustrating large-size disc centering.

Meanwhile, with great rocking or pivoting of the disc sensors 14 and 15, the extensions 14*c* and 15*c* thereof come to ride on the cam pieces 13*a*. As a result, the ends of the stopper parts 21 are detached from the disc transport path, as shown in FIG. 7. The, as shown in FIG. 6, the center of the large-size disc 29 is transported to slightly pass the center of the turntable 6. When the outer periphery of the large-size disc 29 is eventually brought into contact with the contact pieces 22, the large-size disc 29 is stopped. In this way, the first centering of the large-size disc 29 is effected.

At this time, the disc sensors 14 and 15 are biased by the spring force of the torsion spring 17 for rocking in a direction to restore their initial positions. However, the pin 18*a* of the locking lever 18 has been received in the U-shaped notch 14*b*, and the restoration of the disc sensors 14 and 15 has been prevented. Thus, the extensions 14*c* and 15*c* are held in a state that they are on the cams 13*a*, and the ends of the stopper parts 21 are at positions out of the disc transport path. Also, with great rocking of the disc sensors 14 and 15, the movable member 19 has been moved in the direction of inserting the disc 29. The contact pin 20*a* of the trigger lever 20 thus has been moved to a more rearward position corresponding to the large-size disc 29.

In this state, the outer periphery of the large-size disc 29 pushes and causes rocking of the contact pin 20*a*, thus starting the clamper drive mechanism to cause the clamper 7 to approach the turntable 6. At this time, the taper surface 24 of the clamper 7 is brought into contact with the edge of the center hole of the large-size disc 29 to pull back the outer periphery thereof from the contact pieces 22 and thus bring the center of the disc 29 into coincidence with the center of the turntable 6. In this way, the second centering of the large-size disc 29 is completed.

Figure 8:
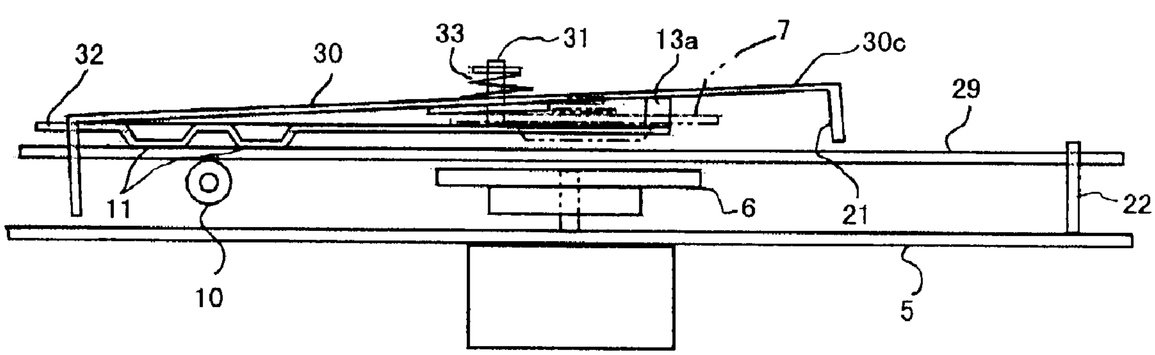
FIG. 8 is a perspective view showing an alternative to the first embodiment according to the present invention.

While in the above embodiment the cam pieces 13*a* serving as guide surfaces have been provided on the support plate 12, it is also possible to provide the cam pieces 13*a* on the side of the disc sensors 14 and 15. Also, while the stopper parts 21 have been provided at the ends of the extensions 14*c* and 15*c* of the disc sensors 14 and 15, it is also possible to adopt an arrangement as shown in FIG. 8. As shown, a compression coil spring 33 as spring member is provided on a pin 31 supporting a disc sensor 30 for rocking such that it biases the disc sensor 30 toward the support plate 12. In this case, when the extension 30*c* comes to ride on the cam piece 13*a*, the entire disc sensor 30 is pushed up by the cam piece 13*a* from the support plate 12. Furthermore, it is also possible to provide the two disc sensors 14 and 15, the coupling member 16, the torsion spring 17, the trigger bar 16, the trigger lever 20 and the cam pieces 13*a* not on the support plate 12 but on the side of the sub-chassis 5.

In the disc centering device according to the Invention, the stopper parts 21 for effecting the first centering of the small-size disc 28 are provided on the disc sensors 14 and 15, and also guide portions 13*a* are provided, which, when the disc sensors 14 and 15 are rocked with insertion of the large-size disc, engage with the disc sensors 14 and 15 to bring the stopper parts 21 to the outside of the disc transport path. Thus, the centering of both large- and small-size discs can be obtained by merely providing the small-size disc stoppers 21 on the disc sensors 14 and 15 themselves. It is thus possible to simplify the disc centering device.

What is claimed is:

1. A disc centering device for a disc player, comprising:

a pair of disc sensors capable of being pivoted, each disc sensor having a small-size disc stopper associated therewith;

a small-size disc inserted through a disc insertion slot and brought into contact with said small-size disc stoppers with the periphery of said small-size disc pushing apart one end of the disc sensors, said small-size disc being thus clamped between a turntable and a damper of the disc player while being positioned;

a large-size disc inserted, in place of said small-size disc, through the disc insertion slot, causing the small-size disc stoppers to retreat from a large-size disc transport path so that said large-size disc is brought into contact with large-size disc stoppers and clamped between the turntable and the clamper of the disc player while being positioned; and a disc guide member, said disc guide member being provided with a pair of guide portions, wherein:

said small-size disc stoppers are provided on the other end of said disc sensors, and the insertion of said large-size disc causes the disc sensors to be pivoted to a much greater extent than with the insertion of said small-size disc, and slide over the respective guide portions, thereby causing retreat of both of said small-size disc stoppers from the large-size disc transport path.

2. The disc centering device according to claim 1, wherein:

each disc of said pair of disc sensors has an extension, with said small-size disc stoppers being provided on the end of each of said extension, respectively, whereby when said disc sensors are pivoted upon insertion of said large-size disc, which pivoting is greater than that of the insertion of said small-size disc, said disc sensors come to slide over the guide portions and are deformed, thereby causing said small-size disc stoppers to retreat from the large-size disc transport path.

3. The disc centering device according to claim 1, wherein:

said disc sensors are mounted to be pivoted on said disc guide member defining said large-size disc transport path, and said guide portions being formed on a part of the disc guide member.

* * * * *